UNITED STATES PATENT OFFICE.

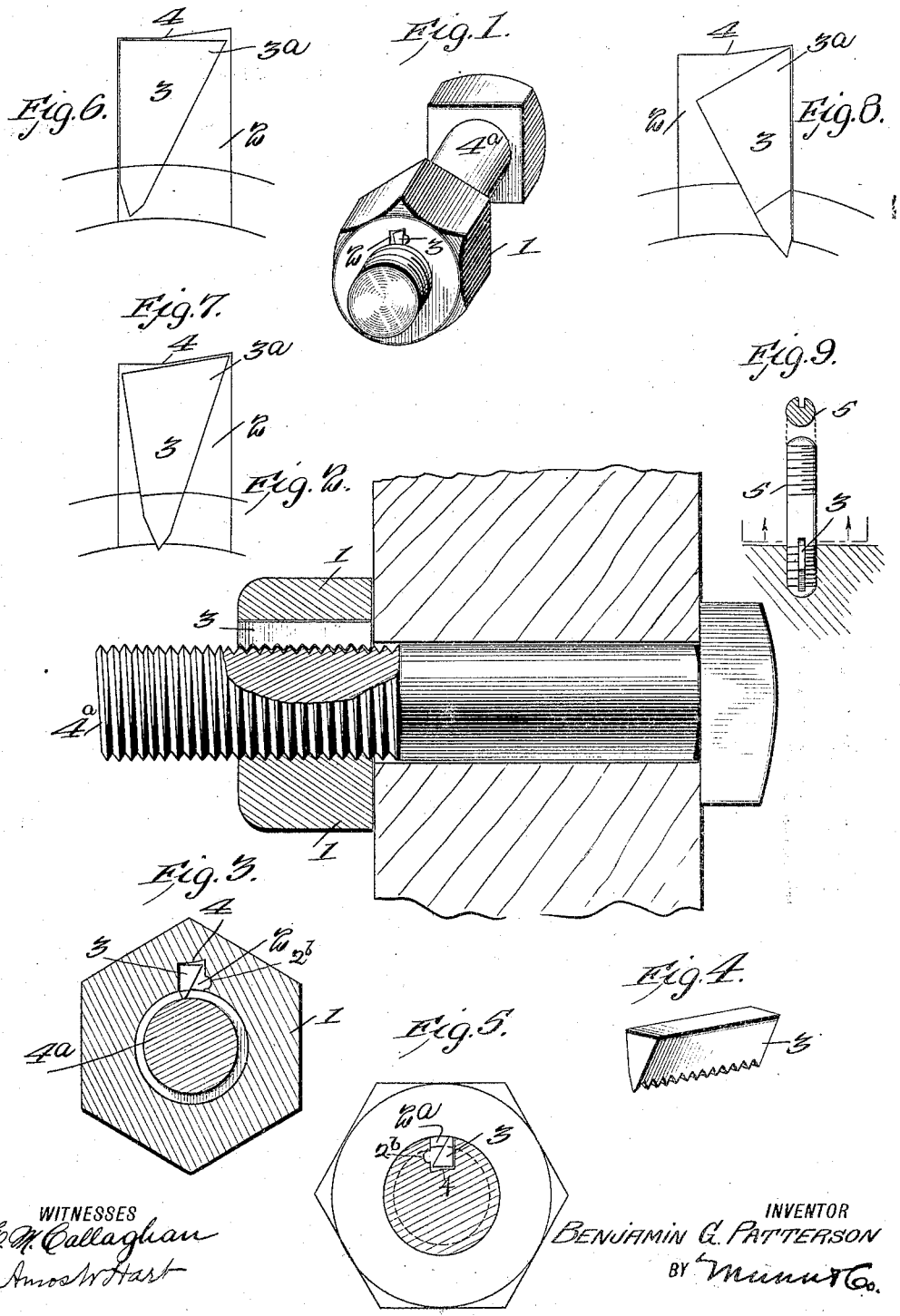

BENJAMIN GILBERT PATTERSON, OF OKLAHOMA, OKLAHOMA, ASSIGNOR OF ONE-FOURTH TO JACOB DANIEL OLIGER, OF DALLAS, TEXAS, AND ONE-FOURTH TO THOMAS BROWN SIMMS AND ONE-TENTH TO JAMES DANIEL DEU PREE, BOTH OF OKLAHOMA, OKLAHOMA.

NUT-LOCK.

1,042,962.     Specification of Letters Patent.     Patented Oct. 29, 1912.

Application filed March 15, 1912. Serial No. 683,933.

*To all whom it may concern:*

Be it known that I, BENJAMIN G. PATTERSON, a citizen of the United States, and a resident of Oklahoma city, in the county of Oklahoma and State of Oklahoma, have invented an Improvement in Nut-Locks, of which the following is a specification.

My invention is an improvement in that class of nut-locks in which a dog or locking device is arranged in a slot or recess in the nut and adapted, when in a certain position, to engage the thread of the bolt, and when in a reverse or opposite position, is out of engagement therewith.

The details of construction, arrangement, and combination of parts are as hereinafter described and illustrated in the accompanying drawing, in which—

Figure 1 is a perspective view of a nut and bolt provided with my improved locking device. Fig. 2 is an enlarged sectional view representing the same parts applied as in use. Fig. 3 is a cross section of a bolt and nut showing the dog or locking device in the non-locking position. Fig. 4 is a perspective view of the dog or locking device. Fig. 5 shows a cross section of the bolt with the slot and dog arranged therein, this being a modification of the usual arrangement. Figs. 6, 7, and 8 are diagrammatic views illustrating the different positions of the dog or locking device. Fig. 9 is a view illustrating the dog or locking device applied to a stud bolt.

In Figs. 1, 2, and 3, a nut 1 is shown provided with a transverse slot 2 in which is arranged a locking device or dog 3. The latter has practically the form of a scalene triangle, in cross section, one corner of the base being acute-angled and the other right-angled—see especially Figs. 6, 7, and 8—and its biting edge is preferably serrated or notched to adapt it to conform to the thread of the bolt 4 to which the nut 1 is shown applied. The bottom of the slot 2—see especially Figs. 6, 7, and 8—is so formed as to describe an obtuse angle in cross section, the apex 4 of the angle constituting a fulcrum for the dog 3 on which the latter is adapted to rock in assuming different positions, as illustrated in Figs. 6, 7, and 8. On one side of the apex of the angle the slot is considerably deeper than the other, and the inner acute angle of the dog enters and bears in this angle of the slot bottom when the dog is engaged with the thread of the bolt, as shown in Figs. 7 and 8.

In Fig. 6, the dog 3 is shown, as in Fig. 3, in the non-locking position, its point not touching the thread of the bolt. In Fig. 7, the dog is shown as having rocked on its fulcrum 4 and become engaged with the thread of the bolt. In Fig. 8, the engagement is shown complete, the acute outer angle 3ª of the dog being engaged in the lowest portion of the slot and the point and the biting edge of the dog deeply engaging the thread of the bolt. It will be understood, however, that owing to the serrations or notches in the biting edge of the dog, the thread of the bolt is not distorted, but the biting edge is extended as deeply as possible into the thread, so that a firm locking engagement results.

In Figs. 3 and 5, the slot 2 is shown provided with a lateral recess 2ᵇ which permits the introduction of a nail or other small instrument, by which the dog may be shifted to the non-locking position when it is desired to detach the nut.

In Fig. 5, I show a modification in which a slot 2ª is formed in the bolt instead of the nut, and the dog 3 is consequently adapted to bite into the thread of the nut instead of into the thread of the bolt as in the other instances already described. It will, therefore, be understood that I may adopt either arrangement of the dog; that is to say, in a slot in the nut or in a slot in the bolt, as the case may be.

In Fig. 9, I show a dog fitted into a slot in a stud bolt 5, said slot extending from the end of the bolt past the thread of the same and beyond the surface of the part into which the bolt is screwed. Thus a space is left between the dog and the inner end of the slot, which permits the insertion of a pointed instrument for unlocking the dog and thus enabling the bolt to be removed.

What I claim is:—

1. The combination of a triangular dog with a threaded bolt and a nut applied thereto and having a lengthwise slot which receives said dog, the bottom of the slot having an obtuse angle on whose apex the dog rests and is adapted to rock laterally, as described.

2. The combination with a screw bolt and a nut having a radial lengthwise slot whose bottom is formed as an obtuse angle, one side of the angular bottom being deeper than the other, of a dog having in cross section the form of a scalene triangle and its inner acute angle being arranged to engage in the deeper side of the angular slot bottom, as described.

BENJAMIN GILBERT PATTERSON.

Witnesses:
 MORA C. CLARK,
 JAS. D. DEU PREE.